Dec. 13, 1949    C. M. O'LEARY    2,491,329
HYDROKINETIC BRAKE
Filed March 7, 1947
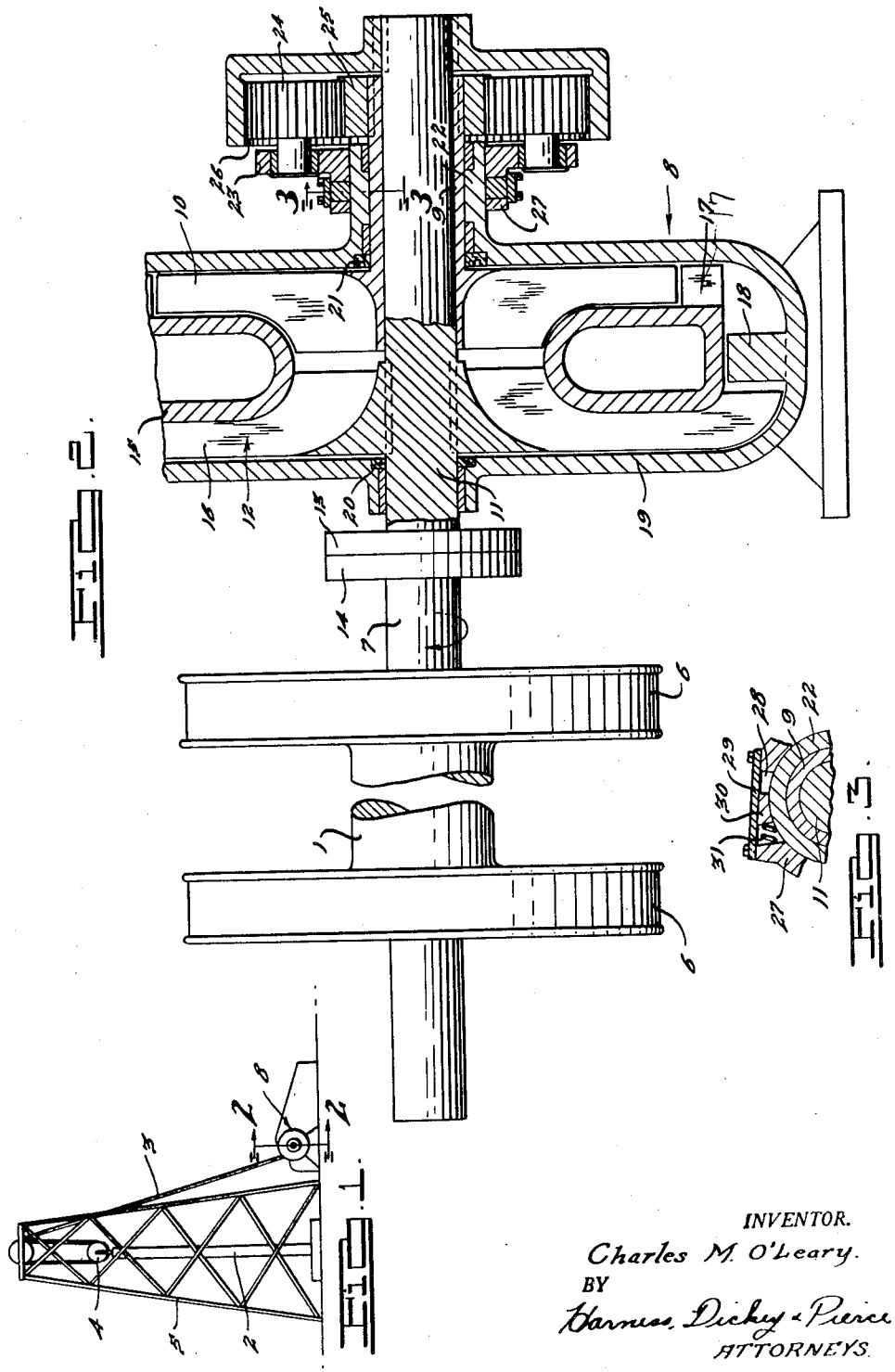
INVENTOR.
Charles M. O'Leary.
BY
Harness, Dickey & Pierce.
ATTORNEYS.

Patented Dec. 13, 1949

2,491,329

UNITED STATES PATENT OFFICE 2,491,329

HYDROKINETIC BRAKE

Charles M. O'Leary, Los Angeles, Calif.

Application March 7, 1947, Serial No. 733,039

11 Claims. (Cl. 188—90)

The present invention relates to a hydrokinetic brake particularly adapted for use on the winding drums of heavy duty hoisting machinery to absorb a portion of the energy of the falling load during unwinding of the drum, and is a continuation-in-part of applicant's copending application, Serial No. 580,678, filed March 2, 1945, now abandoned.

Hydrokinetic brakes have in the past been employed for the above purpose in order to check the speed of the hoisting drum in oil well drilling machines and to reduce the forces and wear on the usual mechanical brakes. Hydrokinetic brakes conventionally employed for this purpose are in the form of hydrokinetic couplings having an impeller element connected to the winding drum and a stationary vaned reaction element. In operation, these prior brakes operate as an ordinary hydrokinetic coupling under stall conditions, and the energy absorbed by the brake is dissipated by any suitable means for cooling the operating liquid in the coupling. The prior constructions have been subject to the objection that they must be of excessive size and weight in order to supply sufficient braking torque to meet the needs of heavy hoisting equipment, such as that employed in oil well drilling. As a result, these units are expensive, difficult to transport and install, and occupy too much space for the already crowded oil well derrick floor.

It has been proposed that the braking torque provided by such units be increased by connecting the shaft to be braked to both elements of the hydrokinetic coupling in such a manner that the two elements are driven in opposite directions by the braked shaft. This is advantageous, but still fails to provide the required braking torque in a sufficiently small unit.

Accordingly, it is the general object of the invention to provide an improved hydrokinetic brake characterized by the fact that it will impose a much larger braking torque for a given size and weight than prior constructions.

This and other objects and advantages are achieved to a very marked degree by utilizing a novel form of driving connection between the two elements of the brake and the shaft to be braked, which connection is effective to rotate one of the elements of the hydrokinetic brake at the speed of the shaft to be braked and the other element in the opposite direction at a substantially higher speed. In the preferred form of the invention, the hydrokinetic brake is in the form of a torque converter having a set of stationary reaction vanes which multiplies the torque transmitted hydrokinetically from the high speed element to the slower element. Maximum braking effect is obtained when the slow speed element is a multistage turbine.

In the drawing,

Figure 1 is a more or less diagrammatic view, showing the application of the invention to an oil well drilling rig;

Figure 2 is a partial section taken on the line 2—2 of Figure 1, showing a more or less diagrammatic illustration of the preferred form of the invention; and Figure 3 is a fragmentary section taken on the line 3—3 of Figure 2.

In the drawing there is illustrated more or less diagrammatically the preferred form of the invention attached to a hoisting drum adapted to receive a hoisting cable in the usual manner. This drum 1 is used in oil well drilling operations, as indicated in Figure 1, to elevate and lower the drill stem 2 by means of the cable 3 and suitable block and tackle 4 carried by the derrick 5 in the conventional manner. The drum is provided with large diameter brake flanges 6 adapted to co-operate with conventional mechanical brake bands or the like, not shown. The drum is fixed to shaft 7, which may be journaled or supported in any suitable manner. The brake mechanism of the present invention preferably comprises a hydrokinetic torque converter, indicated generally at 8, having a tubular or sleevelike shaft 9 connected to the impeller or pumping element 10 and a second shaft 11 telescoped within the shaft 9 and connected to the turbine element 12 of the converter. The shaft 11 is the brake shaft, and is provided with an attaching flange 13 by means of which it may be secured to a mating flange 14 on the drum shaft 7.

The driven element 12 of the torque converter comprises a two-stage fluid turbine, and includes the usual generally doughnut-shaped core member 15 to which is fixed a circumferential series of blades 16 comprising the first stage of the turbine element and a second circumferential series of blades 17 comprising the second stage of the turbine element. A stationary series of blades 18, which is fixed to the stationary housing 19 of the converter, is located intermediate the two stages of vanes on the driven element in the usual manner. Any suitable means, such as the oil seals 20 and 21, may be provided to prevent leakage of the operating liquid from the casing 19.

The housing 19 at one side is provided with a sleeve-like projection 22 in which is journaled the tubular shaft 9, and a supporting cage 23 for a plurality of planet gears 24 is journaled on the projection 22. The planet gears 24 each mesh with a spur gear 25 fixed to the tubular shaft 9 and an internal gear 26 fixed to the shaft 11.

The hub 27 of the cage 23 is equipped with a one-way clutch or brake connection with the stationary projection 22. This connection comprises a plurality of one-way clutch elements, each of which, as best shown in Figure 3, includes a pocket 28 formed in the hub 27 and enclosed by a cover plate 29. A sliding block 30, having a curved inner surface adapted to fit the cylindrical projection 22 and a flat outer surface adapted to engage the inner surface of the plate 29, is located in each pocket and urged to the right, as viewed in Figure 3, by means of a spring 31. The inner surface of the plate 29 extends at such an angle with respect to the surface of the projection 22 engaged by the block 30 that the spring 31 tends to wedge the block between the projection and the plate 29. As a result of this arrangement, the cage 23 may rotate freely in a clockwise direction relative to the projection 22, as viewed in Figure 3, but cannot rotate in a counterclockwise direction. Any other form of one-way clutch may be employed in place of the form illustrated without changing the principle or mode of operation of the invention.

The mechanism so far described operates to permit free rotation of the shaft 11 in a clockwise direction, as viewed in Figure 3, and, consequently, free rotation of the winding drum 1 in that direction. However, the mechanism operates as a hydrokinetic brake upon rotation of the shaft 11 in a counterclockwise direction, as viewed in Figure 3. This corresponds to rotation of shaft 7 in the direction of the arrow in Figure 2.

When the winding drum 1 attempts to rotate in the direction of the arrow on shaft 7 in Figure 2, the shaft 11 will be rotated with the shaft 7 in the same direction, carrying with it the internal gear 26. Such rotation of the internal gear 26 will tend to shift the planetary gear cage 23 in a counterclockwise direction, as viewed in Figure 3; but, since no such movement of the cage can occur due to the one-way clutch mechanism, the cage 23 will remain stationary and the planet gears will rotate the spur gear 25 in a direction opposite to that of the rotation of the internal gear 26 at a greater speed than that of gear 26. The spur gear 25, in turn, drives the impeller element 10 of the torque converter 8 at a speed in excess of the drum speed and in the opposite direction. The torque required to so operate the impeller unit 10 is thus mechanically and positively imposed upon the drum shaft through the gearing and resists rotation of the drum shaft in the direction of the arrow in Figure 2. In addition, the hydraulic fluid in the torque converter, which is circulated by means of the impeller unit 10, will transmit to the driven element 12 a torque which is substantially greater than that required to drive the impeller unit 10. This torque, in turn, is also applied to the shaft 11 and, therefore, to the drum shaft 7 in a direction to oppose rotation of the drum shaft 7 in the direction of the arrow in Figure 2.

Accordingly, the braking force applied to the drum shaft is the sum of the forces acting on the two elements of the torque converter, and, moreover, is many times the torque required to operate the impeller element 10 due to the torque multiplication characteristics of the converter and the multiplication of the impeller torque reaction through the gear drive.

In actual practice, it is possible to construct a torque converter which will multiply torque to any desired degree, depending upon the arrangement of the vanes and the number of stages in the driven element. Torque converters incorporating two-stage driven elements commonly produce a maximum torque multiplication in excess of five to one.

Any suitable means may be provided to connect the impeller unit 10 and the driven element 12 to the member to be braked, so long as the connection will effect the desired rotation of the two in opposite directions, with impeller unit 10 rotating at a speed in excess of the speed of the element 12. However, it is preferred to employ the arrangement of telescoping shafts and planetary gearing illustrated in the drawing because it results in a substantial saving in size and weight. The particular arrangement of planetary gearing shown not only serves to obtain the desired rotation of the impeller and driven element in opposite directions, but also increases the speed of the impeller unit 10. Accordingly, the impeller unit 10 will rotate at a speed in excess of the drum shaft, at which speed it will require more torque and operate more effectively. The speed ratios may be varied, as desired, by changing the size of the internal gear 26 relative to the spur gear 25 and selecting planet gears of appropriate size to co-operate with them. Preferably, the internal gear 26 is made as large as possible within the limits of space available, in order to effect a rotation of the impeller unit 10 at a speed of at least twice and preferably four or more times that of the drum shaft, but in the opposite direction.

No attempt has been made to illustrate means for circulating the operating liquid through the converter and cooling the liquid, because such means may be identical to those commonly employed in the coupler type of hydrokinetic brake. It is sufficient to note simply that such means incorporate either a cooling tower, or a cooling radiator and fan unit, and suitable pumps and/or valves for controlling the circulation of liquid through the hydrokinetic torque transmitting device. It has been the practice with prior hydrokinetic brakes to vary the braking force imposed by the unit at any given drum speed by varying the volume of liquid within the unit through manipulation of valves in the circulating system. That same method may be applied with equal success to the present invention. While in the past it has been considered necessary to maintain torque converters entirely filled with liquid in order to avoid cavitation, this necessity arises from the desire to maintain peak efficiency and to avoid shock loads on the vanes. Efficient transfer of torque is not required in a braking mechanism, so the loss of efficiency due to cavitation is immaterial. Moreover, since the blading need not be constructed to transmit torque at maximum efficiency, it may be more or less roughly and cheaply cast with sufficient thickness of wall section to resist the shock loads incident to cavitation. Accordingly, while a commercial torque converter may be employed, a cheaper and somewhat more rugged design may be utilized to advantage.

While it is preferred to employ a hydrokinetic torque converter in order to obtain the maximum braking torque for a given size of apparatus, nevertheless it will be apparent that certain advantages of the present invention may be realized with a construction employing a hydrokinetic coupler of the type previously used in place of the torque converter, provided the two elements of the coupler are rotated in opposite directions. In such case, the elements of the coupler are simply fixed to the shaft 7 and the tubular shaft 5, respectively, and the resulting braking torque imposed upon the drum shaft will be more than twice that imposed by the same coupler element when connected to the drum shaft in a conventional manner.

In the past, it has been proposed that one element of a hydrokinetic coupling be driven at the speed of the braked shaft and the other element at a lower speed in the opposite direction. An important feature of the present invention resides in the greatly enhanced braking effect for a given size of unit resulting from the fact that the input or pump element 6 is driven at a speed in excess of the speed of the braked shaft. The striking difference between the two systems may best be shown by an illustrative example. For purposes of comparison, it is first assumed that both the prior brake and that of the present invention embody identical hydrokinetic couplers, that the torque delivered to the high speed element of the coupler is transmitted without reduction to the other element, and that the torque required to rotate one element of the coupler at 100 R. P. M. (the speed of the braked shaft) is 10 units. It is also assumed that in the prior brake one element of the coupler is driven at the speed of the braked shaft and the other at one-half that speed, while in the brake of the present invention one element is driven at the speed of the braked shaft and the other at twice that speed.

With the above assumptions, the total braking effect of the prior brake would be the 10 units supplied mechanically to the element which rotates at the speed of the braked shaft plus the torque delivered hydrokinetically to the other element. Ten units would be delivered hydrokinetically to the slow speed element, but, because of the 2 to 1 step-down gearing between the slow element and the braked shaft, only one-half of the hydrokinetically transmitted torque would be applied to the braked shaft. The total braking effect would, therefore, be only 15 units. The total braking effect of the present invention would also be the torque delivered to the high speed element mechanically plus the torque delivered hydrokinetically to the other element. However, since the high speed element is rotating at twice the speed of the braked shaft, it will require four times the torque because the torque required to drive a centrifugal pump increases as the square of the speed. Therefore, the torque delivered mechanically to the high speed element would be 40 units. But to deliver 40 units of torque to the high speed element through 1 to 2 step-up gearing requires 80 units of torque at the braked shaft. To this must be added the torque delivered hydrokinetically to the slow speed element, namely 40 units, for a total of 120 units of braking torque.

Actually, with the preferred form of applicant's invention, which employs a hydrokinetic torque converter rather than a coupler, a much higher braking effect is obtained because the torque delivered hydrokinetically to the slow speed element, or turbine, is higher than that delivered mechanically to the high speed pump element. If, as is possible with a two-stage torque converter, the torque multiplication is 5 to 1, the total braking effect achieved by the present invention would be 280 units. This compares with a total braking effect of 35 units if a two-stage hydrokinetic torque converter were employed in the prior constructions, where the slow speed element is driven at less than the speed of the braked shaft.

It is apparent, therefore, that, on any basis of comparison, applicant's brake for a given size unit will absorb eight times the torque of the prior hydrokinetic brakes when the gear ratio is 2 to 1 in both cases and the hydrokinetic units are the same. Even better comparative results are achieved when, as is preferred, the gear ratio is higher than 2 to 1.

While it is preferred to employ a one-way clutch between the planetary gearing cage 23 and the stationary projections 22 in order to permit free rotation of the drum shaft and shaft 11 in a clockwise direction, as viewed in Figure 3, it is apparent that a manually operated clutch may be substituted for the automatic one-way clutch, or the cage 23 may be permanently fixed to the projection 22 or casing 19 and the braking torque relieved on forward rotation of the drum shaft by draining all fluid from the converter.

The invention has been described as applicable to heavy duty hoisting equipment, but it is apparent that it may also be utilized for other purposes, such as for braking heavy duty trucks and vehicles which are employed in mountainous terrain.

While only one form of the invention is illustrated, it will be apparent that variations in the design and arrangement of parts may be indulged in within the spirit of the invention, as set forth herein, and within the scope of the appended claims.

What is claimed is:

1. A hydrokinetic brake, including a hydrokinetic torque transmitter having a pair of rotary bladed impellers, a housing enclosing the blades of said impellers and forming a continuous fluid course through the blades of both impellers, a geared driving connection between said impellers for rotating one impeller in a direction opposite to the direction of rotation of the other impeller and at a faster speed than the speed of rotation of said other impeller, and means connected to said other impeller and adapted for connection to a shaft to be braked.

2. A hydrokinetic brake, including a hydrokinetic torque transmitter having a pair of rotary bladed impellers, a housing enclosing the blades of said impellers and forming a continuous fluid course through the blades of both impellers, a geared driving connection between said impellers for rotating one impeller in a direction opposite to the direction of rotation of the other impeller and at a faster speed than the speed of rotation of said other impeller, said driving connection including a one-way clutch, and means connected to said other impeller and adapted for connection to a shaft to be braked.

3. A hydrokinetic brake, including a hydrokinetic torque converter having a centrifugal pump and a turbine having two stages of turbine blades, a housing enclosing the blades of said pump and turbine and forming a continuous fluid course through the blades of the pump and turbine, stationary reaction blades located intermediate the two stages of turbine blades, a geared driving connection between said pump and turbine for rotating the pump forwardly when the turbine rotates in a direction opposite to the direction of the torque transmitted to the turbine hydrokinetically on forward rotation of the pump, such pump rotation being at a higher speed than the speed of the turbine, and means fixed to the turbine and adapted for connection to a shaft to be braked.

4. A hydrokinetic brake, including a hydrokinetic torque converter having a centrifugal pump and a turbine having two stages of turbine blades, a housing enclosing the blades of said pump and turbine and forming a continuous fluid course through the blades of the pump and turbine, stationary reaction blades located intermediate the two stages of turbine blades, a geared driving connection between said pump and turbine for rotating the pump forwardly when the turbine rotates in a direction opposite to the direction of the torque transmitted to the turbine hydrokinetically on forward rotation of the pump, such pump rotation being at a higher speed than the speed of the turbine, and means fixed to the turbine and adapted for connection to a shaft to be braked, said driving connection including a one-way clutch for preventing transmission of driving torque to the centrifugal pump when said means rotates in a direction which will effect reverse rotation of the pump.

5. A hydrokinetic brake, including a hydrokinetic torque converter having a centrifugal pump and a turbine, a housing enclosing the blades of said pump and turbine and forming a continuous fluid course through the blades of the pump and turbine, stationary reaction blades located in said fluid course, a geared driving connection between said pump and turbine for rotating the pump forwardly when the turbine rotates in a direction opposite to the direction of the torque transmitted hydrokinetically to the turbine on forward rotation of the pump, the geared driving connection comprising speed increasing gears effective to drive the pump at a higher speed than the speed of the turbine, and means fixed to the turbine and adapted for connection to a shaft to be braked.

6. A hydrokinetic brake, including a hydrokinetic torque converter having a centrifugal pump and a turbine, a housing enclosing the blades of said pump and turbine and forming a continuous fluid course through the blades of the pump and turbine, stationary reaction blades located in said fluid course, a geared driving connection between said pump and turbine for rotating the pump forwardly when the turbine rotates in a direction opposite to the direction of the torque transmitted hydrokinetically to the turbine on forward rotation of the pump, the geared driving connection comprising speed increasing gears effective to drive the pump at a higher speed than the speed of the turbine, and means fixed to the turbine and adapted for connection to a shaft to be braked, said driving connection including a one-way clutch for preventing transmission of driving torque to the centrifugal pump when said means rotates in a direction which will effect reverse rotation of the pump.

7. A hydrokinetic brake, including a hydrokinetic torque transmitter having a pair of rotary bladed impellers, a housing enclosing the blades of said impellers and forming a continuous fluid course through the blades of both impellers, a shaft to be braked extending concentrically through one impeller and connected to the other impeller, a tubular shaft surrounding a portion of said first-mentioned shaft and connected to said one impeller, an internal gear carried by the first-mentioned shaft, a spur gear carried by the tubular shaft and positioned within the internal gear, and planet gears providing a driving connection between said internal and spur gears.

8. A hydrokinetic brake, including a hydrokinetic torque converter having a centrifugal pump and a turbine, a housing enclosing the blades of said pump and turbine and forming a continuous fluid course through the blades of the pump and turbine, stationary reaction blades located in said fluid course, a shaft to be braked extending concentrically through the pump and connected to the turbine, a tubular shaft surrounding a portion of said first-mentioned shaft and connected to the pump, an internal gear carried by the first-mentioned shaft, a spur gear carried by the tubular shaft and positioned within the internal gear, and planet gears providing a driving connection between said internal and spur gears.

9. A hydrokinetic brake, including a hydrokinetic torque transmitter having a pair of rotary bladed impellers, a housing enclosing the blades of said impellers and forming a continuous fluid course through the blades of both impellers, a geared driving connection between said impellers for rotating one impeller in a direction opposite to the direction of rotation of the other impeller and at a speed at least twice the speed of rotation of said other impeller, and a shaft to be braked connected to said other impeller.

10. A hydrokinetic brake, including a hydrokinetic torque converter having a centrifugal pump and a turbine having two stages of turbine blades, a housing enclosing the blades of said pump and turbine and forming a continuous fluid course through the blades of the pump and turbine, stationary reaction blades located intermediate the two stages of turbine blades, a geared driving connection between said pump and turbine for rotating the pump forwardly when the turbine rotates in a direction opposite to the direction of the torque transmitted to the turbine hydrokinetically on forward rotation of the pump, such pump rotation being at a speed at least twice the speed of the turbine, and a shaft to be braked fixed to the turbine.

11. A hydrokinetic brake, including a hydrokinetic torque converter having a centrifugal pump and a turbine, a housing enclosing the blades of said pump and turbine and forming a continuous fluid course through the blades of the pump and turbine, stationary reaction blades located in said fluid course, a geared driving connection between said pump and turbine for rotating the pump forwardly when the turbine rotates in a direction opposite to the direction of the torque transmitted hydrokinetically to the turbine on forward rotation of the pump, the geared driving connection comprising speed increasing gears effective to drive the pump at a speed at least twice the speed of the turbine, and a shaft to be braked fixed to the turbine.

CHARLES M. O'LEARY.

REFERENCES CITED

The following references are of record in the file of this patent:

UNITED STATES PATENTS

| Number | Name | Date |
|---|---|---|
| 1,024,982 | Fottinger | Apr. 30, 1912 |
| 2,135,282 | Fottinger | Nov. 1, 1938 |
| 2,144,256 | Duffield | Jan. 17, 1939 |
| 2,416,311 | Hanson | Feb. 25, 1947 |